United States Patent [19]
Simonutti et al.

[11] Patent Number: 6,030,304
[45] Date of Patent: *Feb. 29, 2000

[54] PRESSURELESS TENNIS BALL

[75] Inventors: Frank M. Simonutti, Jackson; Peter R. Tolley, Humboldt, both of Tenn.; William E. Dillon, Chicago, Ill.; Jerry Matheny, Humboldt, Tenn.

[73] Assignee: Wilson Sporting Goods Co., Chicago, Ill.

[ * ] Notice: Under 35 U.S.C. 154(b), the term of this patent shall be extended for 168 days.

[21] Appl. No.: 08/614,383

[22] Filed: Mar. 12, 1996

[51] Int. Cl.[7] .................................................. A63B 39/00
[52] U.S. Cl. .......................................................... 473/604
[58] Field of Search ................................ 273/61 C, 61 D, 273/61 R, 58 R, 58 B, 58 BA; 525/195; 524/908; 260/998.14; 473/604, 605, 606, 609

[56] References Cited

U.S. PATENT DOCUMENTS

| | | | |
|---|---|---|---|
| 1,573,093 | 2/1926 | Russell et al. | 473/606 |
| 1,991,534 | 2/1935 | Wood | 473/606 |
| 4,145,045 | 3/1979 | Pocklington | 273/61 C |
| 4,306,719 | 12/1981 | Haines et al. | 273/61 C |
| 4,580,781 | 4/1986 | Horiuchi et al. | 273/61 C |
| 4,978,717 | 12/1990 | Hazelton et al. | 525/195 |
| 5,100,947 | 3/1992 | Puydak . | |
| 5,209,471 | 5/1993 | Horiuchi et al. | 273/61 C |
| 5,225,258 | 7/1993 | Nakamura . | |
| 5,460,367 | 10/1995 | Horiuchi et al. | 273/61 C |

*Primary Examiner*—Steven Wong

[57] ABSTRACT

A pressureless tennis ball comprises a novel core which is formed from a compound containing rubber and a plastomer defined as a copolymer of ethylene and one or more alkenes.

9 Claims, 1 Drawing Sheet

PRESSURELESS TENNIS BALL

BACKGROUND

This invention relates to tennis balls, and, more particularly, to a pressureless tennis ball with an improved core.

Tennis balls conventionally include a hollow rubber core and a felt cover. The core of most new tennis balls is pressurized in order to provide greater rebound. A new pressurized tennis ball conventionally has an internal pressure of about 10 to 15 psi gauge.

Because of the pressure differential between the internal pressure in the core and the ambient pressure, the pressurized gas in the core slowly leaks through the core. As a result, new tennis balls must be packaged in airtight pressurized cans in order to maintain the internal pressure in the balls. However, once the can is opened, the pressurized gas in the core begins to leak through the core. As the internal pressure decreases, the rebound or coefficient of restitution of the ball decreases, and the ball eventually becomes unfit for play.

Pressureless tennis balls are available which have little or no increased internal pressure relative to atmospheric pressure. Pressureless tennis balls do not need to be packaged in a pressurized, airtight container, and the rebound of such balls does not decrease because of leakage of internal pressure.

The specifications of the United States Lawn Tennis Association for tennis balls includes the following:

"The ball shall have a bound of more than 53 inches (135 cm.) and less then 58 inches (147 cm.) when dropped 100 inches (254 cm.) upon a concrete base.

"The ball shall have a forward deformation of more than 0.220 of an inch (0.56 cm.) and less than 0.290 of an inch (0.74 cm.) and a return deformation of more than 0.350 of an inch (0.89 cm.) and less than 0.425 of an inch (1.08 cm.) at 18 lb. (8.165 kg.) load. The two deformation figures shall be the averages of three individual readings along three axes of the ball and no two individual readings shall differ by more than 0.030 of an inch (0.08 cm.) in each case."

The internal pressure of a pressurized tennis ball increases the resilience and rebound of the ball. The core of a pressureless tennis ball is typically designed to be higher in rebound and stiffer than the core of a pressurized tennis ball to compensate for the lack of internal pressure. However, previous attempts to increase the stiffness of a tennis ball core have resulted in a decrease in resilience and rebound of the core, which adversely affects the performance of the tennis ball.

SUMMARY OF THE INVENTION

The invention provides an improved core for a pressureless tennis ball. The core is formed from a compound which provides improved stiffness with little or no decrease, and in some cases an increase, in resilience and rebound. The core is comprised primarily of rubber and a plastomer defined as copolymer of ethylene and one or more alkenes.

DESCRIPTION OF THE DRAWING

The invention will be explained in conjunction with an illustrative embodiment shown in the accompanying drawing, in which.

DESCRIPTION OF SPECIFIC EMBODIMENT

Figure 1:
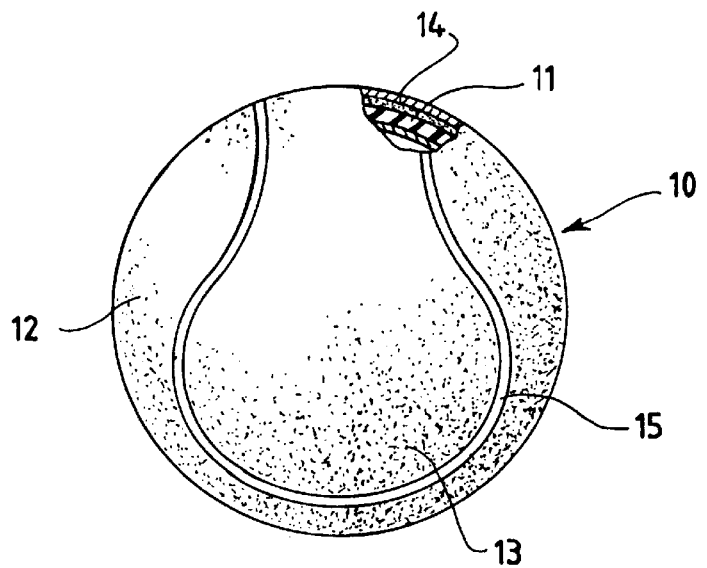
FIG. 1 illustrates a tennis ball, partially broken away, formed in accordance with the invention.
Figure 2:
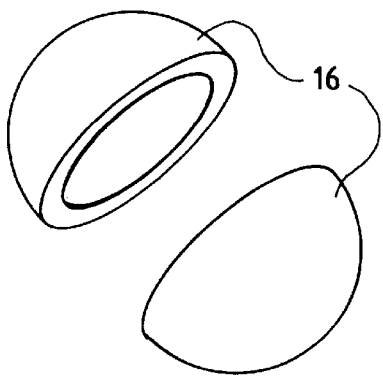
FIG. 2 is an exploded perspective view of the core of the tennis ball.
Figure 3:
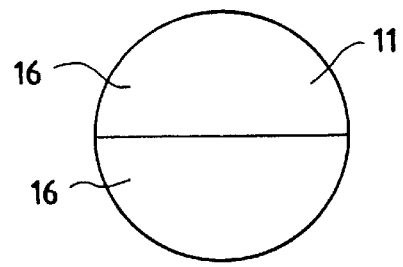
FIG. 3 illustrates the bonded core.

A tennis ball 10 includes a resilient elastomeric core 11 and a felt cover 12. The cover is formed from two dumbbell-shaped pieces 13 of felt which are bonded to the core by adhesive 14. The two pieces of felt are separated by an adhesive seam 15. The core is formed from a pair of hemispherical half shells 16 which are bonded together to form a hollow sphere.

Conventional tennis ball cores are molded from a blended compound which includes rubber as the principal ingredient. As used herein the term "rubber" means any natural or synthetic polymer which can be vulcanized or cured so as to exhibit elastomeric properties. The term "rubber" includes natural rubber, polyisoprene, butyl rubber, polybutadiene, etc. and mixtures thereof. Conventional rubber cores also include additional ingredients such as fillers, dispersants, accelerators, and a vulcanizing agent such as sulfur.

The core of this invention differs from conventional cores primarily in the addition of a plastomer. A plastomer is defined as a copolymer of ethylene and one or more alkenes containing from 4 to 10 carbon atoms. The plastomer preferably contains from 70 to 90.5% by weight of ethylene and from 9.5 to 30% by weight of alkenes. The plastomer preferably has the following physical properties:

| | |
|---|---|
| specific gravity | 0.86 to 0.91 |
| melt index | 0.5 to 30 |
| Shore D hardness | 20 to 50 |
| flexural modulus | 1000 to 10,000 psi |

Suitable materials include ethylene-butene and ethylene-hexene copolymers which are available from Exxon Chemical Co. under the trademark "Exact" and ethylene-octene copolymers which are available from Dow Chemical Co. under the trademark "Engage." We believe that "Exact" plastomers are described in U.S. Pat. No. 4,978,717, which is incorporated herein by reference.

The compound for making the core of this invention includes 100 parts by weight of rubber and from 10 to 50 parts by weight of a plastomer per hundred parts of rubber. Other conventional ingredients can also be included such as fillers and sulfur as the vulcanizing agent.

SPECIFIC EXAMPLES

Four core compounds are set forth in Table I and are identified as J1, J2, P3 and P4. J1 and J2 are control compounds which do not contain plastomer. The J1 and J2 compounds are nearly identical. J2 was developed as a slightly harder version of J1 and has a slightly higher level of HS-870 resin, magnesium carbonate, and silica.

The table lists the weight of each ingredient in terms of parts per hundred parts of rubber. The size, weight, deformation, and rebound of pressureless cores molded from the compounds are listed at the bottom of Table I.

Deformation is a measure of the hardness or stiffness of a tennis ball and is measured using an industry standard testing device, called a Steven's Deflectometer. A tennis ball is placed between two flat parallel plates of the Steven's machine and is preloaded to three pounds compressive load. The instrument is then "zeroed," and an additional 18 pounds compressive load is applied. The amount the tennis ball deflects due to the additional 18 pounds load is then recorded as the deformation of the ball. The lower the value, the stiffer the ball. Measurements are made on three orthogonal axes and then averaged.

Rebound is a measure of the bounce characteristics of the ball. A ball is dropped from a height of 100 inches, as measured to the bottom of the ball, onto a rigid, granite plate. The maximum rebound height of the ball, as measured to the bottom of the ball, is then recorded as the rebound height of the ball. Three individual measurements are made and then averaged for the final value.

The ingredients in Table I other than Exact 4033 plastomer are conventionally used in cores for tennis balls. The core compounds were blended in the conventional manner on a Banbury mixer and molded into half shells which were bonded together to form pressureless hollow cores. For the formulations of Table I, Exact 4033 plastomer was effective for increasing the hardness (decreasing deformation) of the core and simultaneously increasing rebound height.

TABLE I

| DESCRIPTION | SPECIFIC GRAVITY | J1 | J2 | P3 | P4 |
|---|---|---|---|---|---|
| #1 RSS - Natural Rubber | .93 | 100.0 | 100.0 | 100.0 | 100.0 |
| EXACT 4033 Plastomer | .88 | — | — | 20.0 | 40.0 |
| NICHIMEN HS - 870 Styrene | 1.05 | 6.52 | 7.39 | — | — |
| PLIOLITE S8B Hi - Styrene | 1.05 | — | — | 4.35 | 4.35 |
| MAGNESIUM CARBONATE | 2.24 | 13.0 | 13.91 | 13.0 | 13.0 |
| SILICA (190 Surf. Area) | 2.00 | 15.2 | 15.65 | 15.2 | 15.2 |
| ZINC OXIDE | 5.60 | 7.0 | 7.0 | 8.2 | 9.3 |
| STEARIC ACID | .84 | 1.1 | 1.1 | 1.1 | 1.1 |

TABLE I-continued

| DESCRIPTION | SPECIFIC GRAVITY | J1 | J2 | P3 | P4 |
|---|---|---|---|---|---|
| DPG (Diphenylguaindine) | 1.20 | 0.74 | 0.74 | 0.8 | 0.8 |
| DEG (Diethylene - Glycol) | 1.12 | 1.1 | 1.1 | 1.1 | 1.1 |
| MBTS (Thiofide - Accel.) | 1.53 | 1.74 | 1.74 | 1.8 | 1.8 |
| SULFUR (100%) | 2.07 | 6.75 | 6.75 | 7.0 | 7.0 |
| VULKALENT B/C (Retarder) | 1.51 | 1.3 | 1.3 | 1.3 | 1.3 |
| VULKANOX KB (Antioxid.) | 1.03 | 3.04 | 3.04 | 2.8 | 2.8 |
| DISPERGATOR FL (Dispers.) | 1.25 | 3.48 | 3.48 | 3.5 | 3.5 |
| "CORE ONLY DATA" | — | — | — | — | — |
| SIZE (inches) | — | — | 2.425 | — | 2.410 | 2.425 |
| WEIGHT (grams) | — | — | 50.0 | — | 47.9 | 47.1 |
| DEFORMATION (inches) | — | — | .369 | — | .300 | .267 |
| REBOUND (inches) | — | — | 64.6 | — | 65.3 | 65.4 |

Cores made from P3 and P4 compounds were covered with conventional woven felt covers to form pressureless tennis balls and compared with tennis balls made from control cores (J2). The results are listed in Table II.

TABLE II

| | | SPECS. (Pressurized) | Quantity Tested | J2 Compound | P3 Compound 20 Parts Exact 4033 | P4 Compound 40 Parts Exact 4033 |
|---|---|---|---|---|---|---|
| BALL PRESSURE: (psi) | Mean | 2.0–4.0 | 3 | 3.3 | 2.8 | 2.5 |
| | Std. dev. | | | 0.1 | 0.2 | 0.1 |
| SIZE: (inches) | Mean | 2.575–2.700 | 12 | 2.624 | 2.624 | 2.633 |
| | std. dev. | | | 0.010 | 0.009 | 0.009 |
| WEIGHT: (grams) | Mean | 55.0–60.0 | 12 | 57.8 | 58.5 | 57.3 |
| | Std. dev. | | | 0.6 | 0.6 | 0.4 |
| REBOUND: (inches) | Mean | 53.0–58.0 | 12 | 55.7 | 57.3 | 55.9 |
| | Std. dev. | | | 0.7 | 0.4 | 1.0 |
| DEFORMATION: (inches) | Mean | .220–.280 | 12 | 0.244 | 0.235 | 0.219 |
| | Std. dev. | | | 0.006 | 0.004 | 0.005 |
| COR: | | | | | | |
| at 60 ft/sec | | | 3 | 0.635 | 0.647 | 0.630 |
| at 90 ft/sec | | | 3 | 0.521 | 0.534 | 0.524 |

The tennis balls had a slight internal pressure above atmospheric pressure as indicated by "Ball Pressure: Mean."

As can be seen in Table I (Core Data) and Table II (Finish Ball Data), cores and finish balls made with Exact 4033 plastomer had significantly higher rebound and were significantly stiffer than the J2 control compound, which did not include Exact 4033.

Table III lists data for tennis balls with pressureless cores made from three Banbury runs of P3 compound and balls with cores made with J2 control compound. The balls with P3 cores had consistently higher rebounds and increased hardness.

TABLE III

|  |  | SPECS. (Pressurized) |  | P3 Compound Pressureless 1st Banbury | P3 Compound Pressureless 2nd Banbury | P3 Compound Pressureless 3rd Banbury | J2 Compound Pressureless Control |
|---|---|---|---|---|---|---|---|
| BALL PRESSURE: (psi) | Mean Std. dev. | 2.0–4.0 | 8 | 3.3 0.1 | 2.8 0.2 | 2.5 0.1 | 3.6 0.2 |
| SIZE: (inches) | Mean Std. dev. | 2.575–2.700 | 12 | 2.621 0.012 | 2.626 0.009 | 2.621 0.013 | 2.618 0.017 |
| WEIGHT: (grams) | Mean Std. dev. | 55.0–60.0 | 12 | 58.1 0.8 | 58.9 0.4 | 58.1 0.6 | 57.4 0.9 |
| REBOUND: (inches) | Mean Std. dev. | 53.0–58.0 | 12 | 55.8 0.9 | 55.5 0.4 | 55.1 0.8 | 53.7 1.1 |
| DEFORMATION: (inches) | Mean Std. dev. | .220–.280 | 12 | 0.232 0.007 | 0.231 0.003 | 0.228 0.008 | 0.248 0.012 |
| COR: |  |  |  |  |  |  |  |
| at 60 ft/sec |  |  | 3 | 0.645 | 0.641 | 0.633 | 0.625 |
| at 90 ft/sec |  |  | 3 | 0.527 | 0.529 | 0.523 | 0.515 |

While in the foregoing specification a detailed description of a specific embodiment of the invention was set forth for the purpose of illustration, it will be understood that many of the details herein given may be varied considerably by those skilled in the art without departing from the spirit and scope of the invention.

We claim:

1. A tennis ball comprising a hollow core and a cover, the core being formed from a composition including rubber and a plastomer defined as a copolymer of ethylene and one or more alkenes containing 4 to 10 carbon atoms, the tennis ball having a rebound as measured by the United States Lawn Tennis Association of more than 53 inches and less than 58 inches and a forward deformation as measured by the United States Lawn Tennis Association of less than 0.290 inch.

2. The tennis ball of claim 1 in which the alkenes are selected from the class of butene, hexene, and octene.

3. The tennis ball of claim 1 in which the plastomer comprises from 70 to 90.5% by weight of ethylene and from 9.5% to 30% by weight of alkenes.

4. The tennis ball of claim 1 in which the composition includes 100 parts by weight of rubber and 10 to 50 parts by weight of plastomer per 100 parts of rubber.

5. The tennis ball of claim 4 in which the plastomer has a specific gravity of 0.86 to 0.91, a melt index of 0.5 to 30, a Shore D hardness of 20 to 50, and a flexural modulus of 1000 to 10,000 psi.

6. The tennis ball of claim 1 in which the tennis ball has a forward deformation of 0.235 inch or less.

7. The tennis ball of claim 1 in which the tennis ball has a rebound of 55.1 inches to less than 58 inches.

8. A method of decreasing deformation and increasing rebound of a tennis ball core which includes rubber as a principal ingredient comprising the step of adding to the ingredients of the core a plastomer defined as a copolymer of ethylene and one or more alkenes containing 4 to 10 carbon atoms.

9. The method of claim 8 in which 10 to 50 parts by weight of plastomer is added per 100 parts of rubber.

* * * * *